United States Patent [19]
Allen

[11] Patent Number: 5,309,823
[45] Date of Patent: May 10, 1994

[54] COFFEE BREWING ASSEMBLY

[76] Inventor: Dillis V. Allen, 31 W. 211 Rte. 58, Elgin, Ill. 60120

[21] Appl. No.: 868,667

[22] Filed: Apr. 15, 1992

[51] Int. Cl.[5] .......................................... A47J 31/053
[52] U.S. Cl. ......................................... 99/295; 99/312; 426/77; 426/433
[58] Field of Search ................. 99/284, 295, 308, 310, 99/312–314; 426/77, 112, 433

[56] References Cited

U.S. PATENT DOCUMENTS

| | | | |
|---|---|---|---|
| 752,113 | 2/1904 | Savage et al. | 99/312 |
| 945,938 | 1/1910 | Gutermann | 99/312 |
| 1,083,900 | 1/1914 | Brown | 99/295 |
| 1,412,388 | 4/1922 | Clermont | 99/295 |
| 2,001,160 | 5/1935 | Smith | 99/312 |
| 2,743,664 | 5/1956 | Dale | 99/295 |
| 3,081,709 | 3/1963 | Dombrowik | 99/310 |
| 3,119,694 | 1/1964 | Gauld | 426/433 |
| 3,336,857 | 8/1967 | Knodt et al. | 99/295 |
| 3,357,340 | 12/1967 | Berns et al. | 426/433 |
| 3,420,675 | 1/1969 | Costas | 426/77 |
| 3,445,237 | 5/1969 | Gidge | 426/77 |
| 3,469,522 | 9/1969 | Prosen | 99/308 |
| 3,580,163 | 5/1971 | Farrell, Jr. | 99/310 |
| 3,991,664 | 11/1976 | Yamato | 99/310 |
| 4,168,656 | 9/1979 | Wolfer | 99/312 |
| 4,446,158 | 5/1984 | English et al. | 426/77 |
| 4,471,689 | 9/1984 | Piana | 426/112 |

FOREIGN PATENT DOCUMENTS

| | | | |
|---|---|---|---|
| 1102782 | 10/1955 | France | 99/314 |
| 1317638 | 1/1963 | France | 99/312 |
| 519096 | 3/1955 | Italy | 99/312 |
| 621326 | 8/1961 | Italy | 99/314 |
| 376500 | 5/1964 | Switzerland | 99/310 |
| 899055 | 6/1962 | United Kingdom | 426/433 |

Primary Examiner—Timothy F. Simone
Assistant Examiner—Mark Spisich

[57] ABSTRACT

A coffee brewing assembly preferably of the percolation type having a cover assembly that releasably receives a disposable coffee containing annular insert, insertable upwardly into the cover assembly. A percolation tube is fixed to the cover assembly and its end engages and strikes-out a removal tab from the insert as the user slides the insert over and up the tube into an annular recess in the underside of the cover assembly. The coffee insert is also unique and includes an annular semi-rigid frame that holds an annular filter-coffee packet. The insert frame has flanges or projections that snap over cooperating flanges in the cover assembly that suspend the frame in the cover assembly annular recess.

12 Claims, 7 Drawing Sheets

COFFEE BREWING ASSEMBLY

BACKGROUND OF THE INVENTION

There are generally two types of coffee makers today enjoying commercial success in the consumer market: (1) the drip-type, and (2) the percolation-type. The drip-type, exemplified by the Mr. Coffee line, usually includes a U-shaped base, rotated 90 degrees, that receives a coffee container. The upper portion of the arm of the base contains a coffee basket or filter assembly; the lower portion of the base underneath the receiving container includes a warming plate, a U-shaped tube assembly that has an embedded heating coil, and tubes extending upwardly from that heating assembly to a water receiving container in the vertical portion of the base, and a hot water exit tube that extends up into the top coffee basket portion of the base. These drip-type coffee makers are expensive to manufacture, contain literally dozens of parts, and are too bulky to be useable either as a travel coffee system or even a single person brewing system.

The percolation-type coffee makers are somewhat more compact because the basket and percolation tube extend into the coffee receiving container. They nevertheless require a separate coffee basket, separate percolation tube and a separate drinking cup in addition to the electric brewing container. Thus, this type of coffee maker has not achieved great commercial success as either a travel or single person- brewing system.

It is a primary object of the present invention to provide a coffee brewing system that is compact and consists of essentially only two parts including the drinking cup.

SUMMARY OF THE PRESENT INVENTION

In accordance with the present invention, a two-piece coffee brewing assembly is provided designed primarily for the single user and travel market. The two piece design is easier to clean and simpler to travel. The brewing container, designed to brew and hold less than 18 oz. and preferably about 2½ cups or 12.5 oz., also functions as the drinking cup, although the scope of the invention in several aspects is not limited to this dual function.

The function of the coffee basket found in most known systems is replaced by a disposable coffee insert frame that snaps in and out of the cover assembly, one of the two pieces, the other being the container-heater assembly. The user simply snaps the disposable frame into the cover assembly, attaches the cover to the container and begins the brewing cycle. After brewing, the cover is removed, the user discards the coffee insert and drinks directly from the container.

Toward these ends, the cover assembly has a percolation tube fixed centrally therein, eliminating the need for a loose part. The cover is formed with an upwardly extending, downwardly opening recess that releasably receives the ring-like coffee insert frame.

The disposable insert frame is rigid plastic, but thin enough to achieve the required degree of flexibility. The frame is annular and generally flat with a central annular perforated recess portion that receives and holds a coffee packet. The outer peripheral and inner radial portions of the insert frame snap over cooperating flanges in the cover that releasably hold the insert in the cover. The center of the frame has a die-cut ring that forms a finger grip for removal of the insert after brewing is complete and the cover removed.

The insert is guided by the user over the end of the percolation tube as it is loaded in the cover. During this manipulation the end of the percolation tube engages the insert frame ring and forces it downwardly out of the plane of the frame where it is held by the percolation tube itself. This places the ring in a convenient position for user finger grasping for removal of the insert from the cover.

Other objects and advantages of the present invention will appear more clearly in the following detailed description of the preferred embodiment.

DETAILED DESCRIPTION OF THE PREFERRED EMBODIMENT

Figure 1:
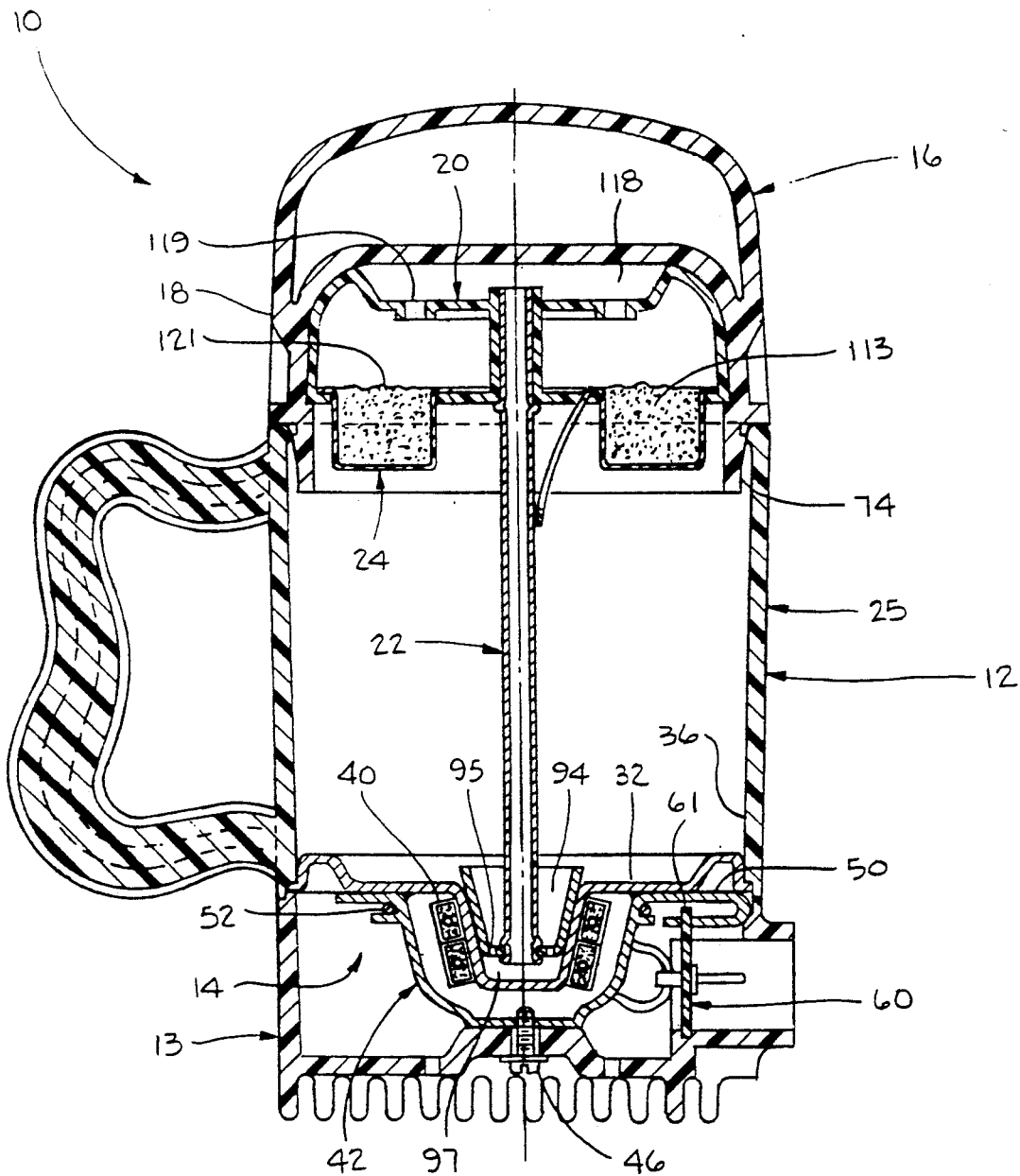
FIG. 1 is a longitudinal section through the coffee brewing assembly according to the present invention.
Figure 2:
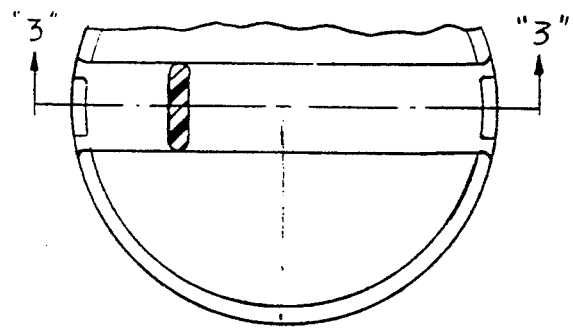
FIG. 2 is a fragmentary top view of the assembly cover according to the present invention.

Referring to the drawings and more particularly the assembly view of FIG. 1, a coffee brewing assembly 10 is illustrated. The coffee brewing assembly is designed to have a capacity of less than 18 oz. and preferably to be a 2½ cup, or 12.5 oz. coffee brewer and combined coffee cup. That is, the brewing container, after the brewing cycle is completed and the cover removed, is utilized as a coffee cup.

The brewing container assembly 10 consists of a container assembly 12 with a removable bottom cover 13 enclosing a heating assembly 14 and a top cover assembly 16 including a top cover member 18, a coffee insert holder 20 and a percolator tube assembly 22. A disposable coffee insert assembly 24 is removably held in the position shown in FIG. 1 by the insert holder 20. The construction of the coffee insert assembly 24 also is novel and forms part of the present invention.

Figure 4:
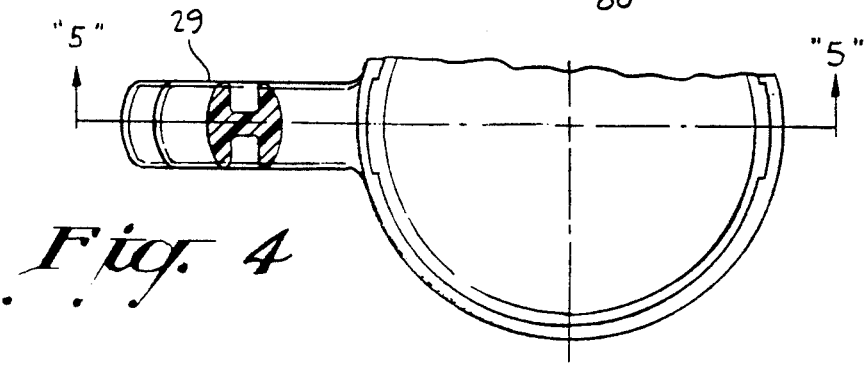
FIG. 4 is a fragmented top view of the container according to the present invention.
Figure 5:
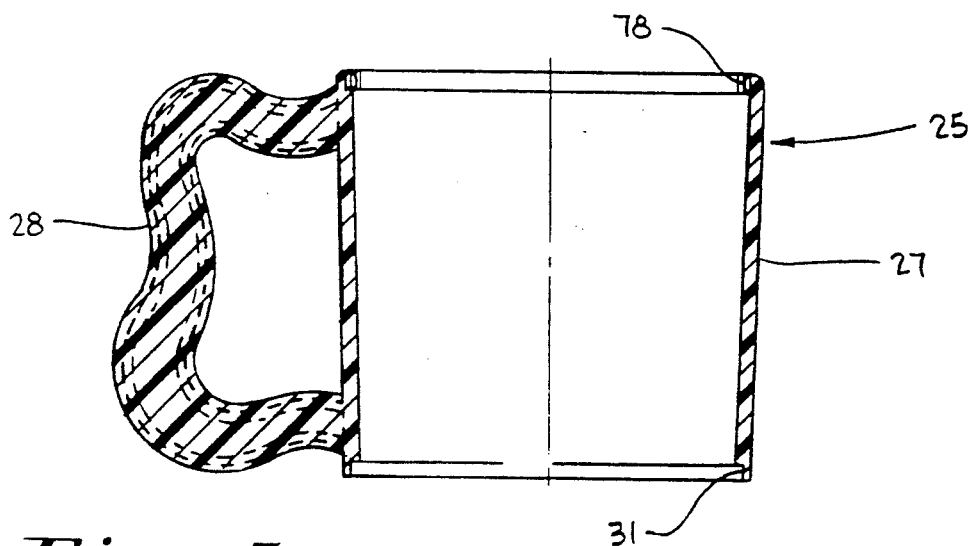
FIG. 5 is a longitudinal section of the container part according to the present invention.

The container assembly 12 includes a one-piece molding 25 also shown in FIGS. 4 and 5 that has an annular wall 27 that forms the side portion of the container assembly 12 and an integral contoured handle 28. Container part 25 is a one-piece plastic injection molding constructed of a high heat resistant plastic as are the other plastic parts of assembly 10, such as "Lexan" manufactured by G. E. Plastics, Inc. As seen in the fragmentary cross-section of FIG. 4 at 29, handle 28 has a generally "H" shaped cross-section.

The container part 25 has an annular counter-bore 31 into which an aluminum container bottom plate 32 is pressed to hold it in position in the bottom of container part 25. Toward this end the bottom plate 32, constructed of 0.0625 in. aluminum plate stock, has an annular peripheral portion 33 that defines a slightly tapered annular wall 34 that engages the inside wall 36 of container part 25 to hold bottom plate 32 in position.

Figure 10:
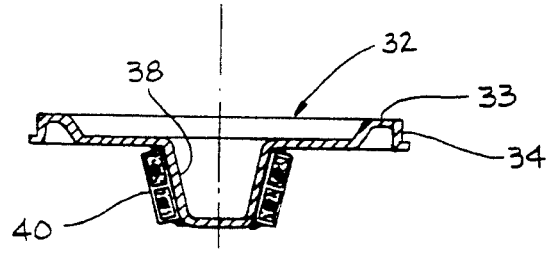
FIG. 10 is a longitudinal section through the container bottom wall assembly taken generally along line 10—10 of FIG. 9.

The bottom plate 32 also forms part of a heater assembly and toward that end and as seen in FIG. 10, as well as FIG. 1, plate 32 has a central downwardly depending cup portion 38 around which a two-turn electric heating element coil 40 is wound. The cup portion 38, along with the annular portion 33, are formed in the aluminum bottom plate 32 by either stamping or spinning. The two-turn heating element coil 40 is brazed to the outer periphery of cup 38 and eliminates the need for the heating element to be die cast in a separate aluminum cup, which is later threaded to the bottom plate, this latter technique being commonly found in coffee brewers in today's marketplace. It is, however, approximately 2.25 times more expensive than the combination of bottom plate 32 and the heating element 40 brazed to the outer periphery of cup 38.

A generally U-shaped stamped aluminum bracket 42 is brazed to the bottom of bottom plate 32 at the same time as the heating element 40. It should be understood that the heating element 40 is clad with aluminum having similar properties to the aluminum bracket 42 and plate 32 so that it can be brazed at the same time and with the same material as the heating coil 40 to the underside of the bottom plate 32 resulting in a significant diminution in cost of the entire assembly. Bracket 42 is principally for the purpose of holding the bottom cover 13 in position on the container part 25, but also serves other functions as will appear.

Figure 12:
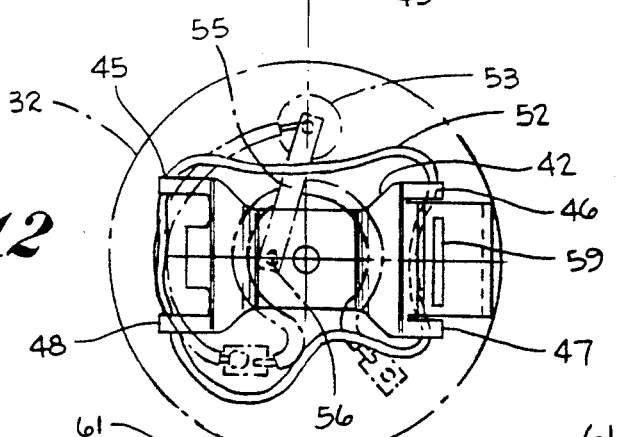
FIG. 12 is a bottom view of the cover bracket illustrated in FIG. 11 shown in relation to the heating element assembly.

As seen in FIG. 12, which is a bottom view, bracket 42 is centrally positioned on the bottom plate 32 and extends over and covers the central part of the heating coil element 40. Bracket central portion 43 is flat and has a central threaded aperture 44 that receives a machine screw 46, as seen in FIG. 1, to hold the bottom plate 13 on annular container part 25.

Figure 11:
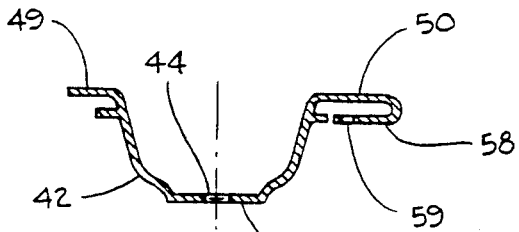
FIG. 11 is a longitudinal section of the bottom cover bracket according to the present invention.

As seen in FIGS. 1, 11 and 12, bracket 42 has four outwardly extending fingers 45, 46, 47 and 48 that are spaced downwardly somewhat from bracket attaching flanges 49 and 50, that receive and hold an asbestos sheath heating resistor 52 in position. The heating resistor 52 is used to maintain coffee temperature after the heating element 40 is disconnected from power by a temperature limiting switch 53 shown in FIG. 12. The temperature limiting switch 53 is held against the lower surface of bottom plate 32 by a spring bracket 55 fixed at 56 to the bracket central portion 43 also as seen in FIG. 12.

Figure 13:
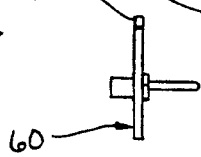
FIG. 13 is a side view of the terminal board subassembly, shown assembled in FIG. 1.
Figure 14:
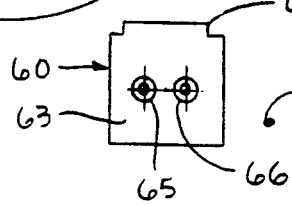
FIG. 14 is a front view of the terminal board subassembly.

Bracket 42 performs another important function and that is to resiliently urge terminal assembly 60 into position in the bottom cover 13. Toward that end bracket flange 50 has a turned over portion 58 that has an elongated slot 59 therein that in turn receives a tongue portion 61 as seen in FIGS. 1, 13 and 14 on the terminal board assembly 60.

Terminal board assembly 60 includes a flat board 63 with a pair of spaced terminal assemblies 65 and 66 therein.

The turned over portion 58 of bracket 42 urges the terminal board 60 downwardly into a slot 68 formed in a rectangular terminal opening 69 that is part of the one-piece plastic molding bottom cover 13.

During assembly, the terminal assembly 60 is fitted into slot 68 and as the cover 13 is positioned over the container part 25, the tongue portion 61 is inserted into slot 59 in bracket portion 58.

Figure 15:
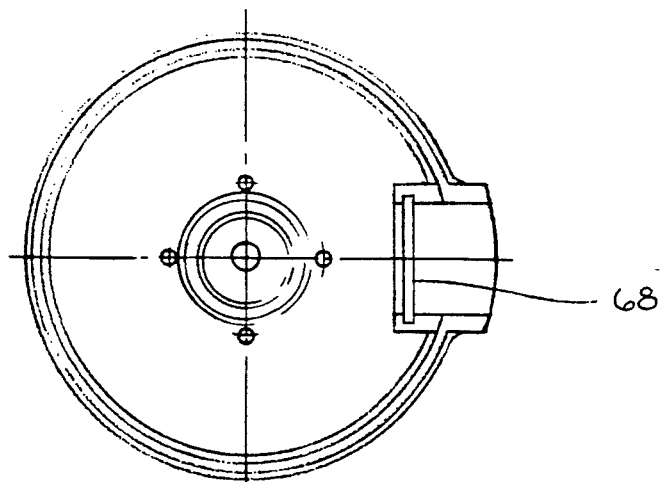
FIG. 15 is a top view of the bottom cover molding.
Figure 16:
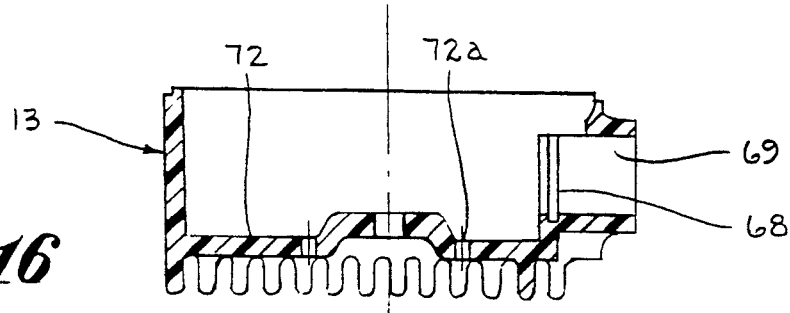
FIG. 16 is a longitudinal section of the bottom cover molding.
Figure 17:
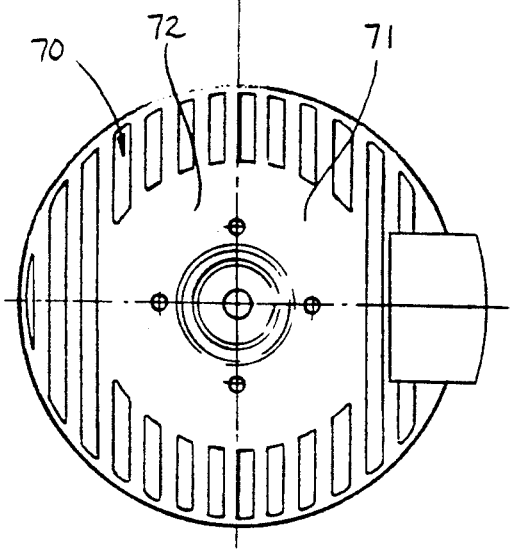
FIG. 17 is a bottom view of the bottom cover molding.
Figure 18:
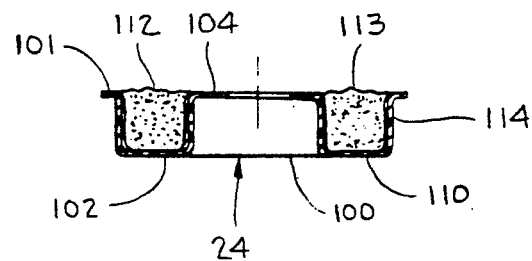
FIG. 18 is a longitudinal section through the coffee insert sub-assembly according to the present invention.

The bottom cover 13 is generally annular in configuration, constructed of the same high temperature resistant plastic as the container part 25 and is seen in subassembly form in FIGS. 15, 16 and 17. The bottom cover 13, as seen in FIG. 17, has a plurality of spaced parallel downwardly depending ribs 70, the central ones of which are relatively short to define an open central bottom area 71 that accommodates a tool for removing screw 36 and also an area on cover bottom wall 72 where descriptive material may be carried. Bottom wall 72 has four vent and drain holes 72(a) therein. Ribs 70 keep the bottom of the assembly 10 cool enough for the user to touch immediately after brewing is completed.

The top cover 18 is a one-piece plastic molding and includes an inverted cup-shaped portion 73 with an integral upwardly extending loop type handle 74 designed to facilitate removal of the cover assembly 16 from container assembly 12 and also because it is spaced a considerable distance above cup-shaped portion 73, the user's fingers, even on above-average sized hands do not engage the cup-shaped portion 73 as the cover assembly 16 is removed, which is desirable because the cup-shaped portion 73 is, at the end of the brewing cycle, at elevated temperatures.

Figure 3:
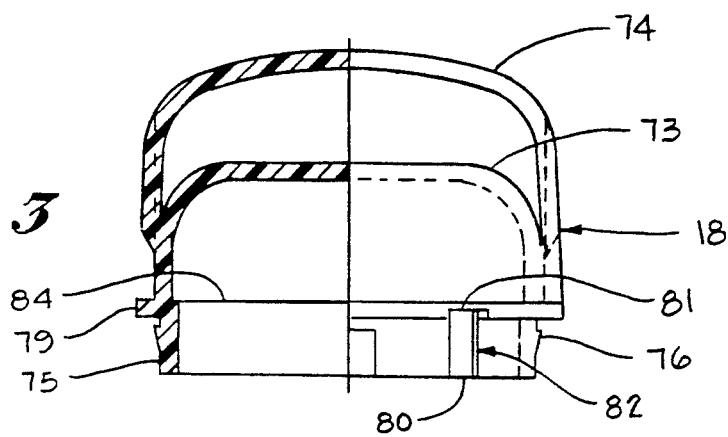
FIG. 3 is a partly fragmented side view of the assembly cover illustrated in FIGS. 1 and 2.

The top cover 18 has a downwardly depending annular flange 75 as seen in FIGS. 1 and 3 that fits within the lower container part 25, and it has a plurality of downwardly tapered integral detents 76(four) that engage an annular bead portion 78 at the upper end of the container part 25 as seen in FIGS. 1 and 5 to hold the cover assembly 16 in position on the lower container assembly 12. Also formed on flange 75 and annular flange 79 are a plurality of sets of slots 80 and 81 that define vents 82 that prevent any extensive build-up of pressure within the brewing assembly 10 during the brewing cycle.

Figure 6:
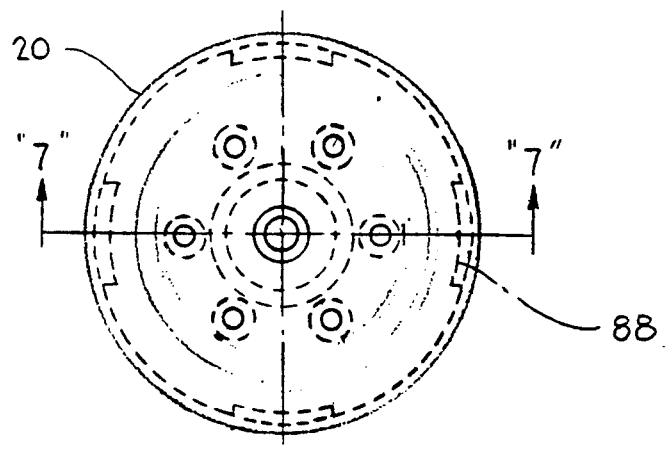
FIG. 6 is a top view of the insert holder subassembly according to the present invention.
Figure 7:
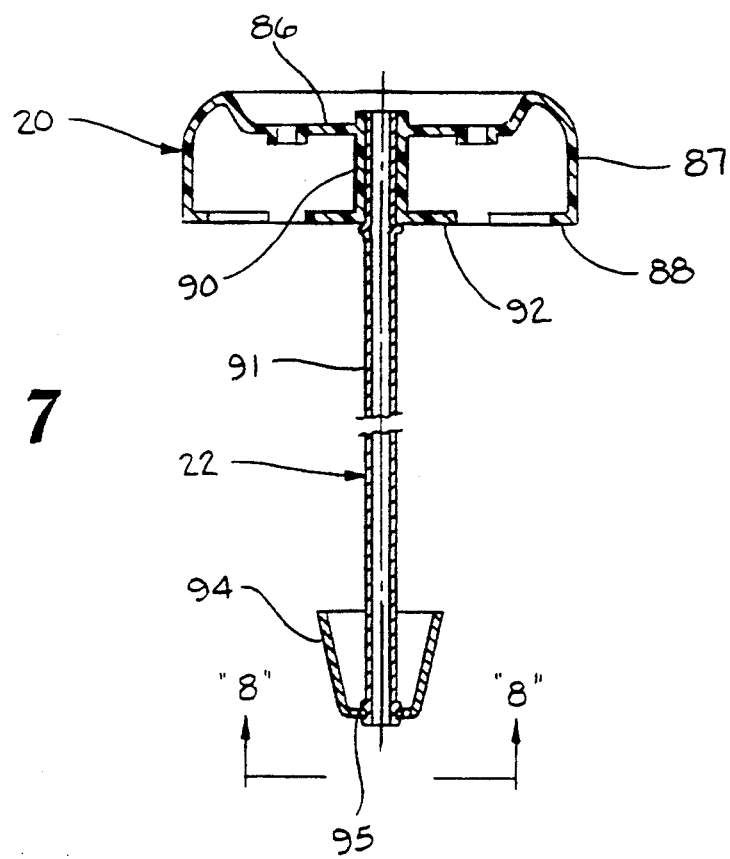
FIG. 7 is a longitudinal section of the insert holder and percolation tube sub-assembly according to the present invention.
Figure 8:
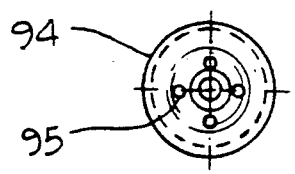
FIG. 8 is a bottom view of the percolator tube cup according to the present invention.
Figure 9:
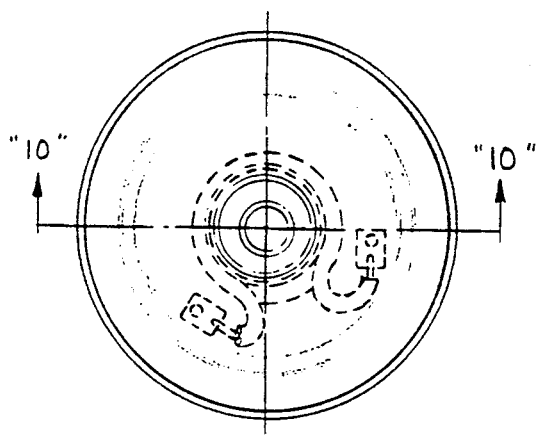
FIG. 9 is a top view of the container bottom wall assembly according to the present invention.

The cover 18 has an internal annular shoulder 84 that locks the insert holder 20 permanently in position within the cover 18. As seen more clearly in FIGS. 6 and 7, the insert holder 20 is a one-piece plastic molding having a generally inverted cup-shape including a recessed top wall 86 and a curved generally annular outer wall 87 that has four horizontal tabs 88 that extend radially inwardly to hold the coffee insert assembly 24 in position. The top wall 86 has an integral central downwardly extending boss 90 that receives and holds percolation tube 91 in position and it has an outwardly extending lower circular integral disc portion 92 that is co-planar with the tabs 88 that assists in holding the coffee insert assembly 24 in position as seen in FIG. 1.

The percolation tube assembly 22 has a cup 94 staked to its lower end that has four equally spaced holes 95 in its bottom wall that permit the flow of fluid or liquid from the container 25 into a percolation volume 97 as seen in FIG. 1 defined by the cup 94 and the cup portion 38 on the bottom plate 32.

In manufacture, the percolation tube 22 is pressed into the insert holder 20 and thereafter the entire assembly is pressed up into the cover 18 until the tabs 88 and insert peripheral wall 87 snap over shoulder 84 in cover 18 securely holding the entire assembly in cover 18 in a practically permanent fashion.

Thus, in distinction with present day percolation assemblies, the percolation tube assembly 22 is fixedly carried by the cover 18 in a unitary assembly 16 that can be inserted and removed in a single motion from the lower container assembly 12.

It should be understood that the length of the percolation tube assembly is selected so as the cover is properly positioned on lower container part 25 and held therein by detents 76, the cover forces the percolation cup 94 downwardly into the bottom plate cup portion 38 so it is in a secure rattle-free position and at the same time seals the percolation volume 97 in cup portion 38 from the main interior volume of the container part 25. This also eliminates any basket rattle during the percolation cycle normally found in today's percolation type coffee makers where the basket is inserted into the main container body before the cover is positioned on the body.

The construction of the coffee insert assembly 24 is shown in somewhat more detail in FIGS. 18 to 21, and is seen to include a vacuum formed body 100 constructed from a high temperature rigid plastic sheet stock on the order of 0.024 inches in thickness. The term "rigid" refers to the polymeric material rather than the resulting construction because a rigid polymer is in fact somewhat flexible when formed into sheet stock at a thickness of 0.024 inches.

Figure 19:
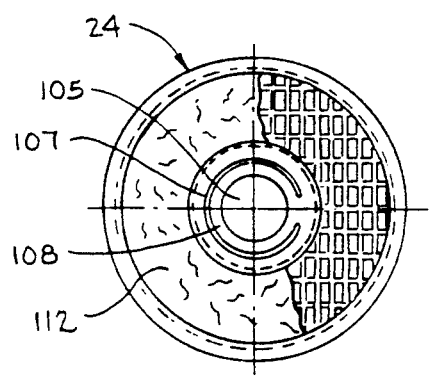
FIG. 19 is a top view of the coffee insert assembly illustrated in FIG. 18.
Figure 20:
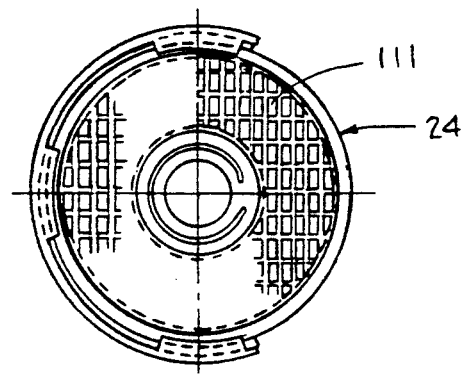
FIG. 20 is a top view of the coffee insert assembly similar to that shown in FIG. 19 mounted within the insert holder shown in fragmentary form.
Figure 21:
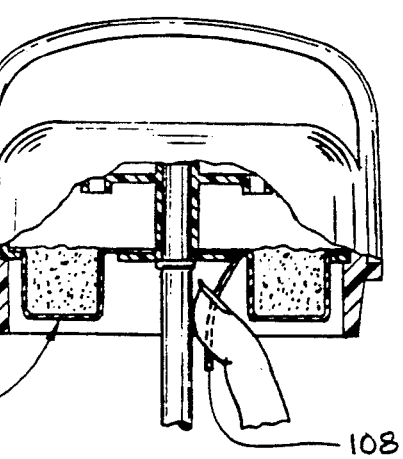
FIG. 21 is a fragmentary section of the top cover assembly in preparation for removal of the coffee insert therefrom.
Figure 22:
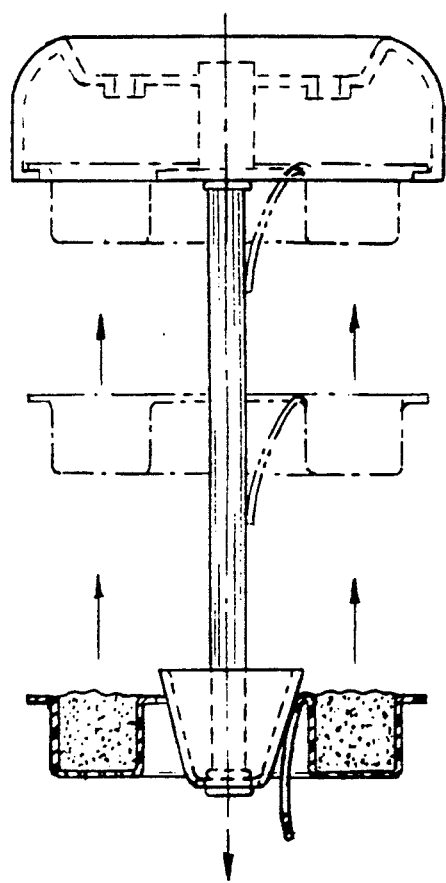
FIG. 22 is a partly exploded view showing the insertion of the coffee insert assembly into the insert holder assembly.

The body 100 is generally circular in configuration having an annular upper outer flange 101, a toroidal recess 102 having a generally rectangular cross-section open at the top and a central circular portion 104 having a central circular aperture 105 therein. The central portion has an arcuate die cut slot at 107 that extends approximately 345 degrees that forms an annular co-planar ring 108 that is an insert removing finger loop as seen in FIG. 21. The slot 107 is sized just slightly larger in diameter than the maximum diameter of percolation cup 94 so that as the insert is forced upwardly over the cup as seen in FIG. 22, the cup will knock the finger ring 108 from the plane of the central portion 105 and maintain it in that dislocated position because it engages the side of the percolation tube 91 The lower wall 110 of the insert body toroidal portion recess 102 has a grid of rectangular openings 111 therein as seen in FIGS. 19 and 20 that permit liquid after passing through the coffee to drop down into the lower container part 25. A coffee ring 112 is adhesively held into the body toroidal recess 102 and includes a ring of filter paper 113 filled by suitably ground coffee 114.

In use, and with reference to FIG. 22, the disposable coffee insert 24 is loaded into the top cover assembly 16 with the cover assembly removed from the lower container assembly 12. The insert 24 is grasped from beneath by the user's finger tips and forced over the percolation cup 94 bending removal ring 108 downwardly. The coffee insert assembly is then pushed upwardly as shown in FIG. 22 until flange 101 and central portion 104, which also defines a flange, snap respectively over the insert holder tabs 88 and central disc portion 92. Flange 101 and central portion 104 may have short radial slots therein, if necessary, to increase their flexibility and facilitate the snapping of the coffee insert into the insert holder 20 although the need for such a feature will vary depending upon the thickness and material of the body 100.

The cover assembly 16 with the coffee insert therein is then positioned into the lower container part 25 to its position illustrated in FIG. 1, after 12½ ozs. of water have been added to container assembly 12. A live plug is then inserted over the terminals in terminal assembly 60 energizing the heating coil 40 which causes the rapid boiling of water in percolation volume 97 in cup portion 38 resulting in boiling water passing upwardly through the percolation tube assembly 22 into volume 118 between the recess or top of insert holder 20 and the cup shaped portion 72 of cover 18, from where it flows through six holes 119 into volume 121 above the coffee insert 24 where it is directed through the coffee filter ring 113 exiting downwardly through the openings 111 in insert body 100 where, of course, it drops into the lower container assembly 12. Of course, because this system is a percolation system, there is some recirculation of liquid passing first through the coffee ring 113 thereby providing more efficient use of the required coffee volume. The brewing cycle time is controlled by the temperature sensing element 53 shown in FIG. 12 that is essentially a temperature switch that shuts off current flow through coil 40 after it senses a certain bottom plate(32) temperature. Thereafter, the circuitry is arranged(in parallel) so that current nevertheless flows through a parallel line from terminals 65 and 66 through a high resistance heating wire 52 that maintains liquid temperature at a predetermined lower value as a "keep warm" feature for the brewer assembly 10.

After the brewing cycle has been completed, as indicated to the user by a cessation of percolation sounds, the user removes the cover assembly 16 by rotating and pulling upwardly on handle 73. After removal, the user's index finger is utilized as shown in FIG. 21, to grasp coffee insert ring 108 pulling the insert downwardly from the cover assembly 16, over percolation cup 94 and then, of course, it is simply discarded.

In summary, it may be seen that the present coffee brewing assembly is particularly advantageous for the small volume coffee consumer, the one person household, or as a travel coffee brewer because it essentially contains but two parts, the top cover assembly 16 and the container assembly 12. Because the coffee inserts 24 are disposable, the normal coffee cleaning of conventional coffee baskets is completely eliminated in the present assembly, and of course, the coffee insert assembly 24 eliminates the need for measuring coffee or utilizing bulky coffee containing containers.

I claim:

1. A coffee brewing assembly, comprising: a container assembly having a heating element therein, and a cover assembly positionable over the container assembly and having a percolation tube fixed thereto extending into the container assembly with the cover assembly position over the container assembly so that when the cover assembly is removed from the container assembly the percolation tube is removed at the same time, said cover assembly having an upwardly extending and downwardly opening annular recess adapted to receive a generally annular disposable coffee insert with a top portion, said cover assembly having flange means for releasably holding the coffee insert in position around the percolation tube, said cover assembly also having means for directing hot water exiting upwardly in the percolation tube over the top portion of the coffee insert.

2. A coffee brewing assembly as defined in claim 1, including a generally annular coffee containing disposable insert adapted to be placed around the percolation tube and inserted inwardly into the cover assembly annular recess, said disposable insert including outer radially extending flanges to releasably hold the insert in the cover assembly, said flange means of the cover assembly is adapted to engage the insert flanges to hang the insert in the cover assembly, said insert having an annular coffee receiving area with coffee therein, said insert including a water permeable cover fixed to the frame enclosing the coffee in the coffee receiving area.

3. A coffee brewing assembly as defined in claim 2, wherein the coffee containing insert has an integral tab to facilitate removal of the insert from the cover assembly.

4. A coffee brewing assembly adapted to be used directly as a user drinking container, comprising: a container assembly having a liquid capacity of less than 18 oz., an electric heating element mounted in a lower portion of the container assembly, a handle projecting outwardly from the lower container assembly, a generally inverted cup-shaped cover assembly having a generally central percolation tube extending downwardly therefrom into the lower container assembly with the cover assembly positioned on the container assembly, said cover assembly having an upwardly extending annular recess around the percolation tube adapted to receive a generally annular coffee insert, said cover assembly having a plurality of flanges extending into the recess adapted to engage and releasably hold the coffee insert in the cover assembly recess, said cover assembly having means to direct hot water from the tube into the annular recess.

5. A coffee brewing assembly as defined in claim 4, including a generally annular coffee containing disposable insert adapted to be placed over the lower end of the percolation tube and inserted upwardly into the cover assembly annular recess, said disposable insert including flexible portions that are adapted to snap over the cover assembly flanges to releasably hold the insert in the cover assembly, the insert having an integral tab to facilitate removal of the insert from the cover assembly.

6. A disposable coffee containing insert for a coffee brewing device having an insert holder with a downwardly opening annular recess with flanges to releasably hold the insert in position, comprising: a somewhat flexible annular frame constructed of a fairly rigid plastic material so the frame does not collapse when held in position by the holder flanges, said frame having a generally annular coffee receiving and supporting portion area, coffee in the coffee receiving area, a water permeable cover fixed to the frame enclosing the coffee in the coffee receiving area, and means for hanging the insert in the coffee brewing device flange portions integral with said frame engageable with the holder flanges to releasably hold the insert in the holder, said frame having a central opening through which a percolation tube passes freely therethrough, said percolation tube being unfixed to the frame.

7. A disposable coffee containing insert for a coffee brewing device as defined in claim 6, wherein the flange portions are located about the periphery of the frame.

8. A disposable coffee containing insert for a coffee brewing device as defined in claim 6, wherein the frame also has integral flange portions that extend radially inwardly around the central opening in the frame.

9. A disposable coffee containing insert for a coffee brewing device as defined in claim 6, wherein the frame has an integral pull tab that permits the user to easily remove the insert from the holder.

10. A disposable coffee containing insert for use with a brewing device having an insert holder with a downwardly opening annular recess with flanges to releasably hold the insert in position, comprising: a somewhat flexible annular frame constructed of a fairly rigid plastic material so the frame does not collapse when held in position by the holder flanges, said frame having a generally annular coffee packet receiving and supporting portion, said frame having integral flange portions engageable with the holder flanges to releasably hold the insert in the holder, wherein the frame has an integral pull tab that permits the user to easily remove the insert from the holder, said pull tab being adapted to be extended from the frame by a percolation tube on the holder.

11. A disposable coffee containing insert for a coffee brewing device as defined in claim 10, wherein the tab is annular and centrally disposed in the insert frame.

12. A coffee brewing assembly, comprising: a container assembly, an upper coffee insert holder assembly positionable over the container assembly having a downwardly opening recess adapted to receive and hold a disposable coffee containing insert as it is pushed inwardly into the insert holder assembly, and a disposable insert including a somewhat flexible annular frame constructed of a fairly rigid plastic material so the frame does not collapse when held in position by flanges formed on the holder assembly, said frame having a generally annular coffee packet receiving and supporting portion area, coffee in the coffee receiving area, water permeable cover fixed to the frame enclosing the coffee in the coffee receiving area, and means for hanging the insert in the coffee brewing device including said frame having integral flange portions engageable with the holder flanges to releasably hold the insert in the holder, said frame having a central opening through which a percolation tube passes freely therethrough, said percolation tube being unfixed to the frame.

* * * * *